United States Patent [19]

Pradat

[11] Patent Number: 4,891,742

[45] Date of Patent: Jan. 2, 1990

[54] PROCEDURE AND DEVICE FOR ELIMINATING INTERFERENCE GENERATED BY POWER SWITCHES

[75] Inventor: Philippe J. Pradat, Les Ulis, France

[73] Assignee: Compagnie de Signaux et d'Equipements Electroniques, France

[21] Appl. No.: 281,242

[22] Filed: Dec. 7, 1988

[30] Foreign Application Priority Data

Dec. 18, 1987 [FR] France .................................. 87 17749

[51] Int. Cl.⁴ .................................................. H02J 1/02
[52] U.S. Cl. ......................................... 363/39; 363/50; 363/84; 363/95
[58] Field of Search .................. 363/39, 40, 44–48, 363/50, 53, 56, 84–85, 89, 95–97

[56] References Cited

U.S. PATENT DOCUMENTS

| | | | |
|---|---|---|---|
| 4,288,729 | 9/1981 | Anzai et al. | 363/63 |
| 4,567,404 | 1/1986 | Flugan | 363/40 |
| 4,717,997 | 1/1988 | Hata | 363/56 |
| 4,719,555 | 1/1988 | Hattori et al. | 363/56 |
| 4,807,102 | 2/1989 | Serras-Paulet | 363/37 |

Primary Examiner—Peter S. Wong
Attorney, Agent, or Firm—Schiller, Pandiscio & Kusmer

[57] ABSTRACT

Device for eliminating interference in a given electrical signal generated by one or several power switches. The device includes an electronic switch interposed on the line of propagation of the signal, a generator of a pulse of programmed duration controlling the operation of the switch, and a delay circuit coupled to receive the switching instruction from the interfering switch or switches for triggering the pulse generator at the moment when the power switching takes place so as to cause the switch or switches to open.

7 Claims, 1 Drawing Sheet

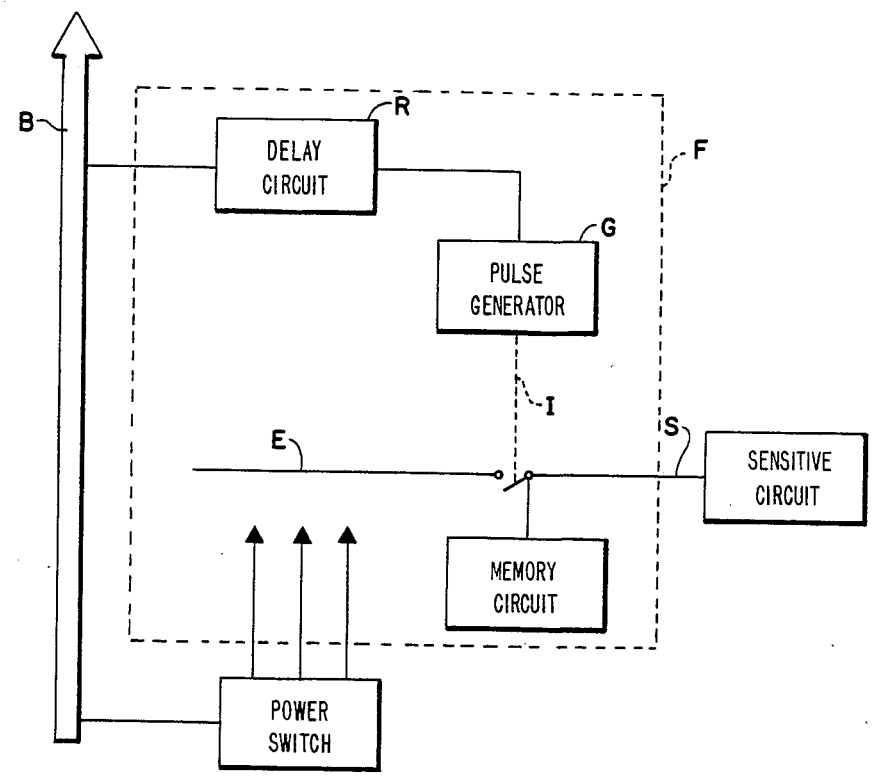

PROCEDURE AND DEVICE FOR ELIMINATING INTERFERENCE GENERATED BY POWER SWITCHES

The present invention concerns a procedure and a device for eliminating interference generated by one or several power switches in a given electrical signal. It also relates to a procedure for eliminating interference generated by these same switches in a digital processing system.

In most chopper-type energy converters with electronic power switches there exists the crucial problem of the necessity of having a low-level electronics coexist with the power electronics itself. The latter generates a significant amount of noise, either by conduction or by radiation, which can disturb both the control electronics of the converter, degrading its performance, and any electronic devices adjacent to or connected to the converter. In general, it can be stated that all signals are disturbed by the power switch to some extent.

Consequently, all circuits must be provided with filters, and, in addition, strict standards must be imposed with regard to the interference emitted by the power circuits, which in practice runs counter to their natural trend toward high switching speeds at increasingly high power levels.

The interference emitted by power circuits is characterized by great harmonic richness and a very broad spectrum shifted toward the high frequencies, from 500 kHz to 30 MHz.

Thus, a low-pass filter becomes the natural choice for the processing of analog signals. However, the power of the interference is such that in order to obtain the necessary attenuation, either very high-performance filters or filters with a very low cutoff frequency have to be used. These filters deplete the information carried by the signal considerably and cause phase delays such that one (or both) of the following constraints must be accepted:

lowering the performance of the system by decreasing the passbands and/or the stability margins;

artificially increasing the cutoff frequency of the power switches, and consequently the losses, merely in an attempt to shift the spectrum as far toward the high frequencies as possible in order to minimize the degradation caused by the filter.

Moreover, complex filters with operational amplifiers are ineffective in rejecting switching noise, since the noise spectrum extends far beyond the band of the highest-performance amplifiers. Thus, the only filters that are relatively effective are passive filters.

The problem of processing of logic signals is similar to the case of analog signals in that changes of state due to noise in an asynchronous logic usually cause unwanted changes of configuration. This is the case, for example, with implementation or safety logics. As a result, here again filters must be used, which is a very troublesome obstacle in a safety logic intended to be fast reacting, for example.

The principal goal of the present invention thus is to eliminate these disadvantages, and to accomplish this end the invention has as its object a procedure which is characterized essentially by the fact that it consists in blocking the propagation of the signal for the duration of the interference.

The high-power interference emitted by a chopper converter is preceded in most cases by a low-level control instruction. Consequently, information which can be used to anticipate the interfering event is available at all times, thus making it possible to perform timed filtering, as opposed to the frequency filtering techniques used heretofore.

A device for the implementation of this procedure is characterized by the fact that it includes:

an electronic switch interposed on the line of propagation of the signal, a generator of a pulse of programmed duration controlling the operation of this switch, and a delay circuit receiving the switching instruction from the interfering switch or switches, in order to trigger the pulse generator at the moment when the power switching takes place.

The switching instructions preferably are distributed throughout all the sensitive circuits by means of a bus.

This arrangement constitutes a simple and low-cost means of providing timed filtering on all circuits susceptible to interference.

It is also known that in order to limit the interference caused by switches in digital processing systems, for example microprocessors, strict noise suppression standards must be imposed on switchable power converters. Moreover, to limit the propagation of conducted noise, galvanic and faradic barriers are set up between the low-level networks and the power networks. This expedient obviously is an obstacle to the integration of microprocessor controls into high-performance converters.

To eliminate this drawback, the procedure according to the invention consists in generating exceptions in the operation of the system throughout the duration of the interference.

An embodiment of the invention is described below by way of example, with reference to the attached drawing, in which the single figure is a block diagram of a timed-filtering module according to the invention.

The filtering module, designated in its entirety by the reference letter F, receives at its input E the logic or analog signal to be filtered and delivers at its output S the same signal, filtered.

Interposed between the input E and the output S is an electronic switch I associated with a memory circuit M. This switch is controlled by a pulse generator G, which in turn is triggered by a delay circuit R receiving the switching instruction from the power switches over a bus B. The bus B thus distributes the cadence of the switching instructions through all the sensitive circuits, including within the converter itself, thus making is possible to regulate the problem of self-interference.

The delay circuit R introduces a delay corresponding to the propagation time of the power switching instruction, and consequently triggers the pulse generator G at the precise moment when the power switching takes place. The generator G generates a pulse whose programmed duration corresponds to the duration, known a priori, of the power interference, thus causing the signal to be sampled and blocked by means of the electronic switch I.

The memory circuit M stores the last value reached by the signal at the moment that the switch I opens and restores the real value when it closes. It therefore functions as a tracker.

The filtering module F thus is alternately a blocker and a tracker, and consequently makes possible timed filtering of the logic or analog signal.

In the case of digital processing, the clocks of the microprocessors have frequencies close to the most intense lines of the switching pulse spectra. In this case, therefore, exceptions within the microprocessor program must be generated from the same switching bus B. The exceptions can apply to a broad operating range if the frequency of the interference is low or if the calculating time is long enough. In the opposite cases they can be limited to operations which are sensitive from the standpoint of the reliability of the software.

What is claimed is:

1. A method of preventing interference generated by the operation of at least one power switch, which opens and closes in response to a control signal, from affecting an electrical signal, the method including the step of blocking the transmission of said electrical signal in response to said control signal for the duration of said interference.

2. A method according to claim 1, further including the steps of sampling information present in said electrical signal at the instant the transmission of said electrical signal is blocked, storing said information, and restoring information present in said electrical signal when said interference terminates using said stored information.

3. A method according to claim 1, wherein the transmission of said electrical signal is blocked after said at least one power switch receives said control signal and at the precise moment when said power switch closes.

4. A method of preventing interference generated by the operation of at least one power switch in a digital processing system, which power switch opens and closes in response to a control signal, from affecting sensitive circuits in the digital processing system, the method comprising the steps of preventing electrical signals transmitted to said sensitive circuits from reaching said sensitive circuits in response to said control signal for the duration of said interference.

5. A device for preventing interference created by the operation of one or more power switches from affecting electrical signals carried over a line located in the vicinity of said power switches, wherein each of said power switches switch on and begin carrying power after receiving a first switching instruction, said device comprising:

switch means, coupled to said line, for opening and closing said line in response to a pulse of predetermined duration provided to said switch means;

pulse means for generating said pulse of predetermined duration in response to a triggering signal and for providing said pulse to said electronic switch means; and delay means, coupled to each of said power switches so as to receive each of said first switching instructions, for generating said triggering signal at the instant each of said power switches begin to carry power.

6. A circuit comprising:

a line for carrying an electrical signal;

at least one power switch positioned in the vicinity of said line such that said power switch generates an interference affecting said electrical signal when said power switch initially carries power in response to a first switching instructions;

an electronic switch, coupled to said line, for opening said line in response to a pulse of predetermined duration;

a pulse generator for generating said pulse of predetermined duration in response to a triggering signal and for providing said pulse to said electronic switch; and a delay circuit, coupled to said power switch so as to receive said first switching instruction, for generating said triggering signal (a) after said at least one power switch has received said first switching instruction and (b) at the instant said at least one power switch begins to carry power.

7. A circuit according to claim 6, further including memory circuit means for storing information present in said electrical signal at the instant said electronic switch opens said line and for restoring information to electrical signal when said interference terminates using said stored information.

* * * * *

UNITED STATES PATENT AND TRADEMARK OFFICE
CERTIFICATE OF CORRECTION

PATENT NO. : 4,891,742

DATED : January 2, 1990

INVENTOR(S) : Phillipe J. Pradat

It is certified that error appears in the above-identified patent and that said Letters Patent is hereby corrected as shown below:

Claim 4, column 3, line 34, delete "steps" and substitute therefor -- step --;

Claim 5, column 4, line 13, delete "begin" and substitute therefor -- begins --; and Claim 6, column 4, line 21, delete "instructions" and substitute therefor -- instruction --.

Signed and Sealed this

Twenty-sixth Day of February, 1991

Attest:

HARRY F. MANBECK, JR.

*Attesting Officer*   *Commissioner of Patents and Trademarks*